US011988181B2

(12) United States Patent
Nomura et al.

(10) Patent No.: US 11,988,181 B2
(45) Date of Patent: May 21, 2024

(54) FUEL DISTRIBUTION PIPE

(71) Applicant: Sanoh Industrial Co., Ltd., Tokyo (JP)

(72) Inventors: Masakazu Nomura, Koga (JP); Kotaro Sato, Koga (JP)

(73) Assignee: Sanoh Industrial Co., Ltd., Tokyo (JP)

( * ) Notice: Subject to any disclaimer, the term of this patent is extended or adjusted under 35 U.S.C. 154(b) by 0 days.

(21) Appl. No.: 18/038,394

(22) PCT Filed: Nov. 11, 2021

(86) PCT No.: PCT/JP2021/041507

§ 371 (c)(1),
(2) Date: May 23, 2023

(87) PCT Pub. No.: WO2022/113749

PCT Pub. Date: Jun. 2, 2022

(65) Prior Publication Data

US 2023/0417208 A1 Dec. 28, 2023

(30) Foreign Application Priority Data

Nov. 27, 2020 (JP) ................................ 2020-196883

(51) Int. Cl.
*F02M 55/02* (2006.01)
*F02M 37/00* (2006.01)

(52) U.S. Cl.
CPC ...... *F02M 55/025* (2013.01); *F02M 37/0011* (2013.01); *F02M 2200/247* (2013.01)

(58) Field of Classification Search
CPC ............. F02M 55/025; F02M 37/0011; F02M 2200/247; F02M 55/02; F02M 37/0017
See application file for complete search history.

(56) References Cited

U.S. PATENT DOCUMENTS

2009/0223486 A1 9/2009 Weizenauer et al.
2014/0041635 A1* 2/2014 Keller .................... F02M 55/02 123/469

FOREIGN PATENT DOCUMENTS

EP 3636912 A1 4/2020
JP 2009-524761 A 7/2009
(Continued)

OTHER PUBLICATIONS

Patent Cooperation Treaty, International Preliminary Report on Patentability, Application No. PCT/JP2021/041507, dated Jun. 8, 2023, in 6 pages.
(Continued)

*Primary Examiner* — Jacob M Amick
(74) *Attorney, Agent, or Firm* — PROCOPIO, CORY, HARGREAVES & SAVITCH LLP

(57) ABSTRACT

A fuel distribution pipe that distributes and supplies fuel supplied from a fuel pipe to a plurality of fuel injection devices includes a pipe member configured to form a storage space for storing the fuel therein, and a connection member inserted into and joined to a tip end portion of the pipe member and having a through hole connected to the storage space. The connection member has an intermediate diameter portion adjacent to the storage space and a small diameter portion disposed on a side opposite to the storage space with respect to the intermediate diameter portion. The intermediate diameter portion has an inner diameter that is larger than an inner diameter of the small diameter portion and smaller than an inner diameter of the pipe member.

8 Claims, 9 Drawing Sheets

(56) References Cited

FOREIGN PATENT DOCUMENTS

| | | | |
|---|---|---|---|
| JP | 2012-097690 | A | 5/2012 |
| JP | 2017-101643 | A | 6/2017 |
| JP | 2018-031271 | A | 3/2018 |
| WO | 2007/085313 | A1 | 8/2007 |

OTHER PUBLICATIONS

Patent Cooperation Treaty, International Search Report, Application No. PCT/JP2021/041507, dated Dec. 14, 2021, in 4 pages.

* cited by examiner

FUEL DISTRIBUTION PIPE

CROSS-REFERENCE TO RELATED APPLICATIONS

This application is US National Stage of International Patent Application PCT/JP2021/041507, filed Nov. 11, 2021, which claims benefit of priority from Japanese Patent Application 2020-196883, filed Nov. 27, 2020, the contents of both of which are incorporated herein by reference.

TECHNICAL FIELD

One aspect of the present invention relates to a fuel distribution pipe that distributes and supplies fuel to a plurality of fuel injection devices.

BACKGROUND ART

In a direct injection engine or the like, a fuel distribution pipe is used to distribute and supply high-pressure fuel compressed by a high-pressure pump to a plurality of fuel injection devices. Patent Literature 1 describes a fuel delivery pipe to which a fuel supply path (fuel pipe) is connected to distribute and supply fuel to a plurality of injectors. In the fuel delivery pipe, an orifice for reducing pulsation of the fuel delivery pipe is formed at a tip end portion of a main pipe hole (a storage space) formed inside the fuel delivery pipe.

CITATION LIST

Patent Literature

[Patent Literature 1] Japanese Unexamined Patent Publication No. 2012-097690

SUMMARY OF INVENTION

Technical Problem

The fuel distribution pipe includes a pipe member that forms a storage space for storing fuel therein, and a connection member that is inserted into and joined to a tip end portion of the pipe member and has an inner diameter smaller than an inner diameter of the pipe member. In such a fuel distribution pipe, when the fuel is pressurized, the pipe member tends to expand due to the pressure of the fuel. However, since the tip portion of the pipe member into which the connection member is inserted and joined has increased rigidity due to the connection member, and the expansion is inhibited, only a central portion forming the storage space of the pipe member tends to expand. As a result, high stress is generated at a boundary portion between the central portion and the tip end portion of the pipe member, which may accelerate metal fatigue and may shorten the life thereof.

Here, it is conceivable to increase a wall thickness of the pipe member so that the pipe member does not expand due to the pressure of the fuel. However, increasing the wall thickness of the pipe member increases a weight and cost of the fuel distribution pipe. Further, when an outer diameter of the pipe member increases due to the increase in the wall thickness of the pipe member, the degree of freedom in layout of the fuel distribution pipe decreases. When an inner diameter of the pipe member becomes smaller due to the increase in the wall thickness of the pipe member, noise emission increases due to pulsation of the fuel caused by an operation of the high-pressure pump.

Thus, it is an object of one aspect of the present invention to provide a fuel distribution pipe capable of reducing the stress generated in the pipe member while allowing the pipe member to expand.

Solution to Problem

A fuel distribution pipe according to an aspect of the present invention is a fuel distribution pipe that distributes and supplies fuel supplied from a fuel pipe to a plurality of fuel injection devices, including a pipe member configured to form a storage space for storing the fuel therein, and a connection member inserted into and joined to a tip end portion of the pipe member and having a through hole connected to the storage space, wherein the connection member has an intermediate diameter portion adjacent to the storage space and a small diameter portion disposed on a side opposite to the storage space with respect to the intermediate diameter portion, and the intermediate diameter portion has an inner diameter that is larger than an inner diameter of the small diameter portion and smaller than an inner diameter of the pipe member.

In the fuel distribution pipe, the connection member inserted into and joined to the tip end portion of the pipe member has the intermediate diameter portion adjacent to the storage space and the small diameter portion disposed on the side opposite to the storage space with respect to the intermediate diameter portion, and the intermediate diameter portion has the inner diameter that is less than the inner diameter of the pipe member and greater than the inner diameter of the small diameter portion. That is, in the connection member, rigidity of the intermediate diameter portion adjacent to the storage space is lower than rigidity of the small diameter portion. Therefore, when the pressure of the fuel is received, the intermediate diameter portion of the connection member also easily expands following a central portion of the pipe member forming the storage space. Thus, stress generated at a boundary portion between the central portion and the tip end portion of the pipe member is curbed.

A cross section of the storage space perpendicular to a central axis of the pipe member may be substantially the same in an entire region of the pipe member in an extending direction. In this fuel distribution pipe, since the cross section of the storage space perpendicular to the central axis of the pipe member is substantially the same in the entire region of the pipe member in the extending direction, it is possible to curb occurrence of local stress concentration when the pipe member expands due to the pressure of the fuel.

The connection member further has a tapered diameter portion connected to the intermediate diameter portion and the small diameter portion and having an inner diameter that decreases from an intermediate diameter portion side to a small diameter portion side. In the fuel distribution pipe, since the tapered diameter portion connected to the intermediate diameter portion and the small diameter portion and having the inner diameter that decreases from the intermediate diameter portion side to the small diameter portion side is formed in the connection member, the intermediate diameter portion can be made to expand more easily following the central portion of the pipe member forming the storage space.

An angle formed by an inner peripheral surface of the tapered diameter portion in a reference cross section including the central axis of the pipe member may be 110° or more and 160° or less. In the fuel distribution pipe, since the angle formed by the inner peripheral surface of the tapered diameter portion in the reference cross section including the central axis of the pipe member is 110° or more and 160° or less, it is possible to curb the connection member becoming too long and to expand the intermediate diameter portion of the connection member appropriately.

In the extending direction of the pipe member, a length of the intermediate diameter portion may be shorter than an insertion length of the connection member into the pipe member and longer than a thickness of the intermediate diameter portion. In the fuel distribution pipe, since the length of the intermediate diameter portion in the extending direction of the pipe member is shorter than the insertion length of the connection member into the pipe member and longer than the thickness of the intermediate diameter portion, it is possible to curb the connection member becoming too long and to expand the intermediate diameter portion of the connection member appropriately.

The thickness of the intermediate diameter portion may be 0.3 times or more and 1.5 times or less a thickness of the pipe member. In the fuel distribution pipe, since the thickness of the intermediate diameter portion is 0.3 times or more and 1.5 times or less the thickness of the pipe member, while the rigidity of the intermediate diameter portion is sufficiently secured, the intermediate diameter portion can further easily expand following the central portion forming the storage space of the pipe member.

The connection member may be a pipe connection member connected to the fuel pipe. In the fuel distribution pipe, since the connection member is a pipe connection member, the fuel supplied from the fuel pipe can be appropriately supplied to the storage space over a long period of time.

The inner diameter of the small diameter portion may be 1 mm or more and 11 mm or less. In the fuel distribution pipe, when the connection member is a pipe connection member, the inner diameter of the small diameter portion is 1 mm or more and 11 mm or less, and thus it is possible to curb the fuel distribution pipe becoming too large while the fuel supplied from the fuel pipe is appropriately supplied to the storage space, and it is possible to curb obstruction of passage of the fuel.

The connection member may be a sensor connection member connected to a fuel pressure sensor that detects a pressure of fuel stored in the storage space. In the fuel distribution pipe, since the connection member is the sensor connection member, the pressure of the fuel stored in the storage space can be appropriately transmitted to the fuel pressure sensor over a long period of time.

The inner diameter of the small diameter portion may be 3 mm or more and 9 mm or less. In the fuel distribution pipe, when the connection member is a sensor connection member, the inner diameter of the small diameter portion is 3 mm or more and 9 mm or less, and thus it is possible to curb the fuel distribution pipe becoming too large while the pressure of the fuel stored in the storage space is appropriately transmitted to the fuel pressure sensor, and it is possible to curb obstruction of passage of the fuel.

Advantageous Effects of Invention

According to one aspect of the present invention, the stress generated in the pipe member can be reduced while the pipe member is allowed to expand.

DESCRIPTION OF EMBODIMENTS

Figure 1:
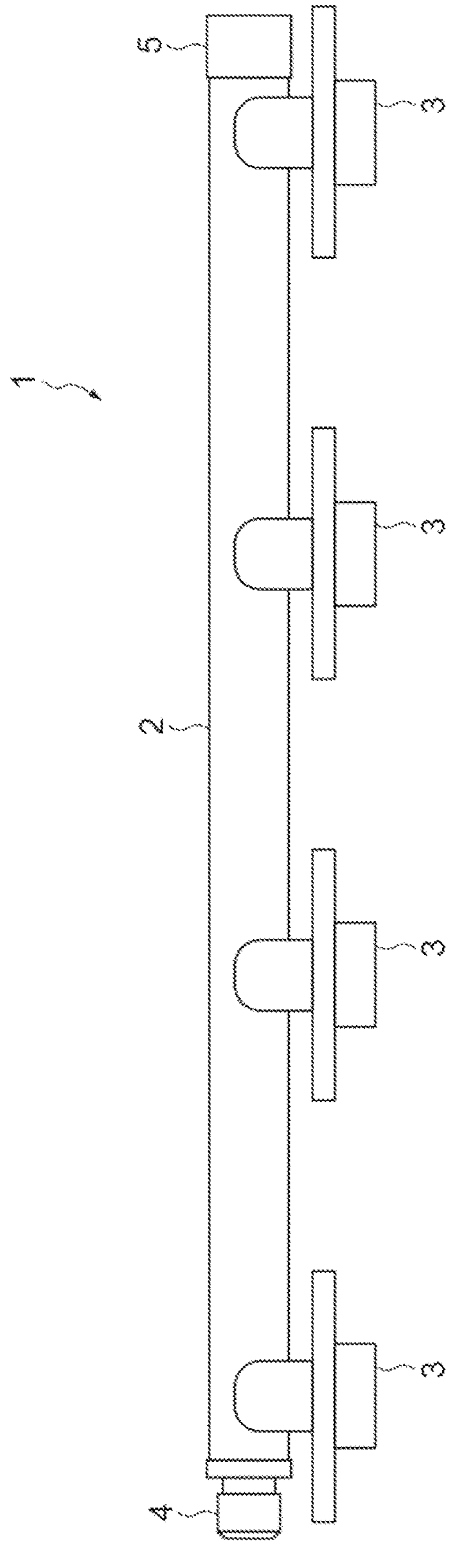
FIG. 1 is a schematic front view of a fuel distribution pipe according to a first embodiment.

A fuel distribution pipe according to an embodiment will be described below with reference to the drawings. In each drawing, the same or corresponding elements are denoted by the same reference numerals, and overlapping descriptions will be omitted.

First Embodiment

Figure 2:
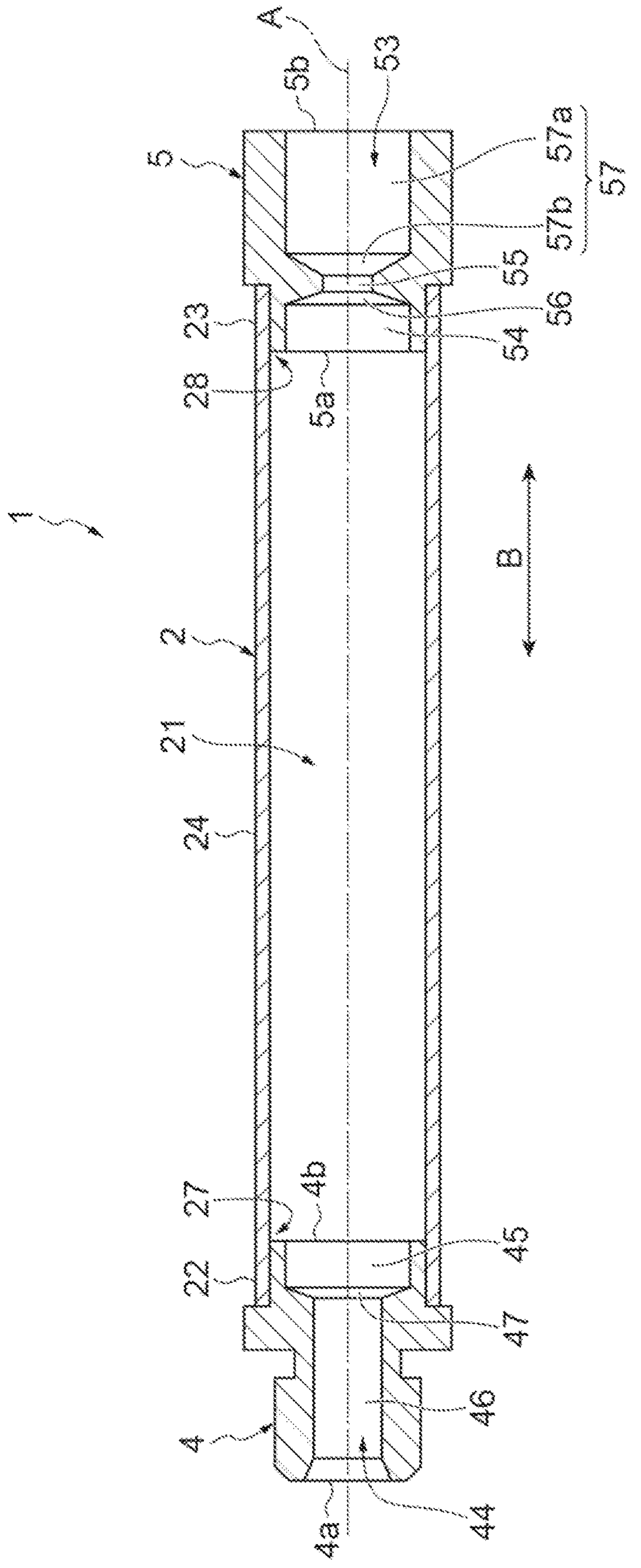
FIG. 2 is a schematic cross-sectional view showing a part of the fuel distribution pipe shown in FIG. 1.

FIG. 1 is a schematic perspective view of a fuel distribution pipe according to a first embodiment. FIG. 2 is a schematic cross-sectional view showing a part of the fuel distribution pipe shown in FIG. 1. As shown in FIGS. 1 and 2, the fuel distribution pipe 1 according to the present embodiment distributes and supplies high-pressure fuel compressed by a high-pressure pump (not shown) and supplied from a fuel pipe (not shown) to a fuel injection device (not shown) provided corresponding to each cylinder (not shown) of an engine (not shown). The fuel distribution pipe 1 is also called a fuel injection rail, a fuel delivery pipe, a common rail, or the like.

The fuel distribution pipe 1 includes a pipe member 2, a plurality of housings 3, a pipe connection member 4 and a sensor connection member 5. Although the drawing shows the fuel distribution pipe 1 including four housings 3, the number of housings 3 is not particularly limited as long as it is two or more.

The pipe member 2 is a member for storing fuel pumped from a high-pressure pump in a high-pressure state in order to supply fuel to a plurality of fuel injection devices. The pipe member 2 is formed, for example, in the shape of a circular pipe extending linearly in a direction of a row of cylinders (a direction of a crankshaft) of an engine. The pipe shape of the pipe member 2 does not necessarily have to be the shape of the circular pipe extending linearly, and can be of various shapes. A storage space 21 for storing fuel is formed inside the pipe member 2. As will be described below, the pipe connection member 4 is inserted into and joined to a tip end portion 22 on one side (the left side in FIGS. 1 and 2) of the pipe member 2, and the sensor connection member 5 is inserted into and joined to a tip end portion 23 on the other side (the right side in FIGS. 1 and 2) of the pipe member 2. Therefore, the storage space 21 is formed by a central portion 24 of the pipe member 2 into which the pipe connection member 4 and the sensor connection member 5 are not inserted and joined. The pipe member 2 is fixed to the engine by a member such as a stay (not shown).

A cross section of the storage space 21 orthogonal to a central axis A of the pipe member 2 is substantially the same in the entire region of the pipe member 2 in an extending direction B. Here, “substantially the same” is not limited to being exactly the same, but means that manufacturing errors or tolerances of about ±10% are allowed. For example, when an intermediate plate thickness between the thickest portion and the thinnest portion of the pipe member 2 is used as a reference plate thickness, a plate thickness at any position on the pipe member 2 is within ±10% of the reference plate thickness. The central axis A of the pipe member 2 is a line passing through a radial center of the pipe member 2 and extending in the extending direction B of the pipe member 2.

The housing 3 is a member for airtightly holding the fuel injection device and supplying fuel from the storage space 21 of the pipe member 2 to the fuel injection device. The housing 3 is joined onto a peripheral surface of the pipe member 2. The joining of the housing 3 to the pipe member 2 can be performed by brazing, welding, or the like. The housing 3 is provided corresponding to the fuel injection device.

Figure 3:
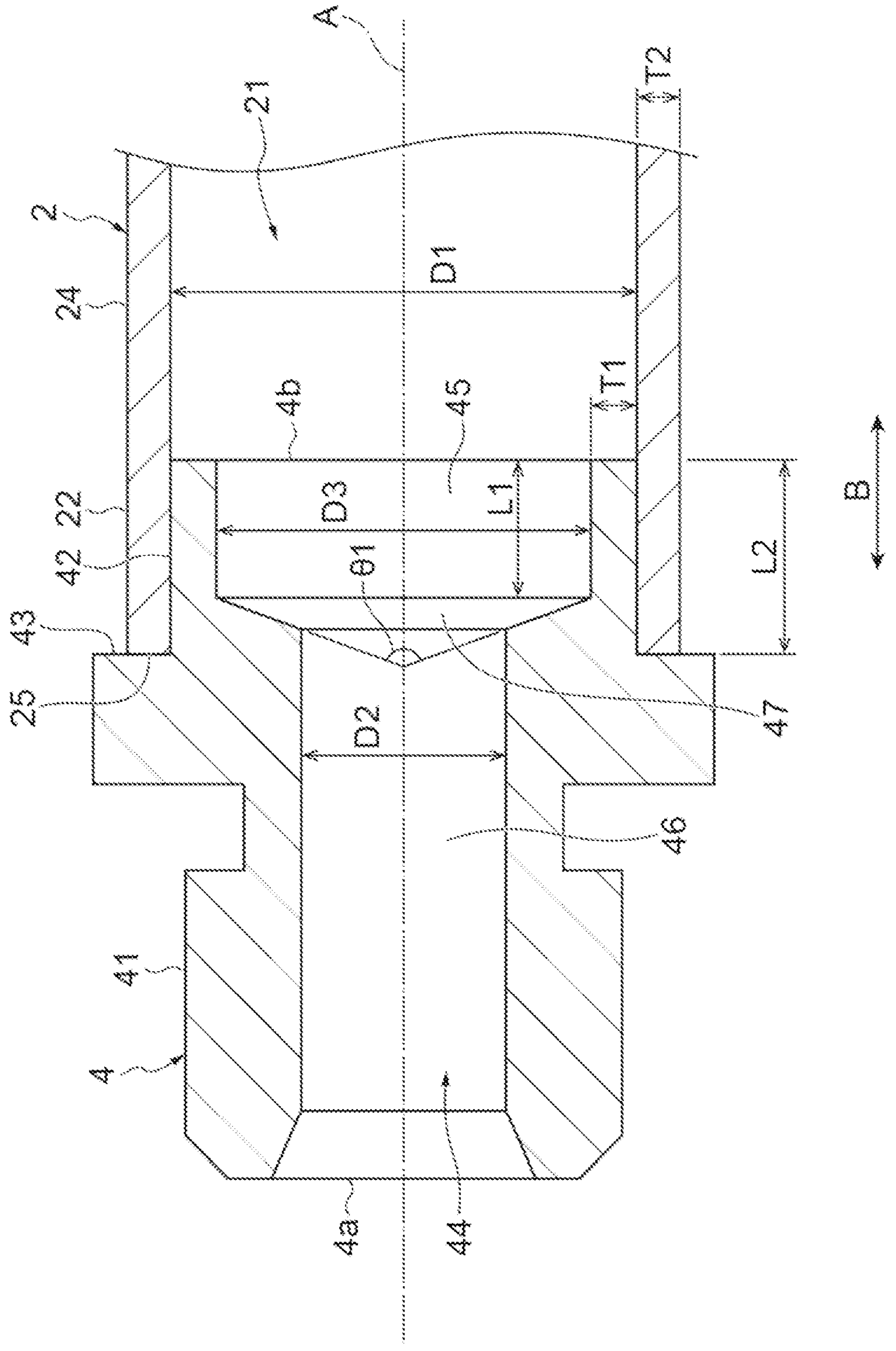
FIG. 3 is a schematic cross-sectional view enlarging the periphery of a pipe connection member in FIG. 2.

FIG. 3 is a schematic cross-sectional view enlarging the periphery of the pipe connection member in FIG. 2. As shown in FIGS. 1 to 3, the pipe connection member 4 is a connection member connected to a fuel pipe. The pipe connection member 4 is formed in a tubular shape around the central axis A of the pipe member 2. A tip end on one side of the pipe connection member 4 in the extending direction B (a tip end on the left side in FIGS. 1 to 3) is referred to as an outer tip end 4*a*, and a tip end on the other side of the pipe connection member 4 in the extending direction B (a tip end on the right side in FIGS. 1 to 3) is referred to as an inner tip end 4*b*.

The pipe connection member 4 is inserted into and joined to the tip end portion 22 of the pipe member 2. The joining of the pipe connection member 4 to the tip end portion 22 of the pipe member 2 can be performed by brazing, welding, or the like. In the present embodiment, the pipe connection member 4 is joined to the pipe member 2 by brazing.

An outer peripheral surface of the pipe connection member 4 has a male screw surface 41, an insertion surface 42 and a contact surface 43. The male screw surface 41 forms a male screw for screwing the fuel pipe. The male screw surface 41 extends in the extending direction B from the outer tip end 4*a* toward the inner tip end 4*b*. A tapered surface or the like may be formed between the male screw surface 41 and the outer tip end 4*a* to easily screw the fuel pipe.

The insertion surface 42 extends in a cylindrical shape in the extending direction B from the inner tip end 4*b* toward the outer tip end 4*a*. The contact surface 43 rises radially outward of the pipe connection member 4 from the insertion surface 42 on the outer tip end 4*a* side of the insertion surface 42. Then, in a state in which the insertion surface 42 is inserted into the tip end portion 22 of the pipe member 2 and the contact surface 43 is in contact with a tip end surface 25 of the tip end portion 22 of the pipe member 2, the insertion surface 42 is brazed to the tip end portion 22 of the pipe member 2. The contact surface 43 of the pipe connection member 4 may also be brazed to the tip end surface 25 of the pipe member 2. The tip end surface 25 of the pipe member 2 is an end surface on the tip end portion 22 side of the pipe member 2 in the extending direction B. Also, a tapered surface or the like may be formed between the insertion surface 42 and the inner tip end 4*b* to easily insert the pipe connection member 4 into the tip end portion 22 of the pipe member 2.

An outer diameter of the insertion surface 42 before the insertion surface 42 is inserted into the tip end portion 22 of the pipe member 2 may be larger than an inner diameter of the pipe member 2. Thus, the insertion surface 42 is brazed in a state in which it is press-fitted into the tip end portion 22 of the pipe member 2 by inserting the insertion surface 42 into the tip end portion 22 of the pipe member 2 and brazing. For example, unevenness may be formed on the insertion surface 42 by knurling or the like so that the maximum outer diameter of the protrusion is larger than the inner diameter of the pipe member 2 and the minimum outer diameter of the recess is smaller than the inner diameter of the pipe member 2. Thus, since the protrusion portion is pressed against the tip end portion 22 of the pipe member 2 and a brazing material enters the recessed portion, a rigidity of a joining of the insertion surface 42 to the tip end portion 22 of the pipe member 2 can be increased.

The inner peripheral surface of the pipe connection member 4 forms a through hole 44 for supplying high-pressure fuel supplied from the fuel pipe to the storage space 21. The through hole 44 is adjacent to the storage space 21 and extends in the extending direction B around the central axis A of the pipe member 2.

The pipe connection member 4 has an intermediate diameter portion 45, a small diameter portion 46 and a tapered diameter portion 47. The intermediate diameter portion 45 is a part of the pipe connection member 4 adjacent to the storage space 21. The small diameter portion 46 is a part of the pipe connection member 4 located on the side opposite to the storage space 21 with respect to the intermediate diameter portion 45. The tapered diameter portion 47 is a part of the pipe connection member 4 located between the intermediate diameter portion 45 and the small diameter portion 46 and connected to the intermediate diameter portion 45 and the small diameter portion 46. The intermediate diameter portion 45, the tapered diameter portion 47 and at least a part of the small diameter portion 46 form the insertion surface 42. That is, the insertion surface 42 is formed by an outer peripheral surface of the intermediate diameter portion 45, an outer peripheral surface of the tapered diameter portion 47, and an outer peripheral surface of at least a part of the small diameter portion 46.

An inner diameter D2 of the small diameter portion 46 is smaller than an inner diameter D1 of the pipe member 2. In the present embodiment, the inner diameter D2 of the small diameter portion 46 is the smallest inner diameter of the through hole 44.

The inner diameter D1 of the pipe member 2 is not particularly limited. For example, from the viewpoint of curbing noise emission generated by fuel pulsation caused by the operation of the high-pressure pump, the inner diameter D1 of the pipe member 2 may be 10 mm or more, preferably 11 mm or more, and more preferably 12 mm or more. From the viewpoint of curbing the fuel distribution pipe 1 becoming too large, the inner diameter D1 of the pipe member 2 may be 16 mm or less, preferably 15 mm or less, and more preferably 14 mm or less. Maximum and minimum values thereof can be combined as appropriate, and for example, the inner diameter D1 of the pipe member 2 may be 10 mm or more and 16 mm or less, preferably 11 mm or more and 15 mm or less, and more preferably 12 mm or more and 14 mm or less.

The inner diameter D2 of the small diameter portion 46 is not particularly limited. For example, from the viewpoint of curbing obstruction of passage of fuel, the inner diameter D2 of the small diameter portion 46 may be 1 mm or more, preferably 2 mm or more, and more preferably 3 mm or more. Further, from the viewpoint of curbing the fuel distribution pipe 1 becoming too large, the inner diameter D2 of the small diameter portion 46 may be 11 mm or less, preferably 10 mm or less, and more preferably 9 mm or less. Maximum and minimum values thereof can be combined as appropriate, and for example, the inner diameter D2 of the small diameter portion 46 may be 1 mm or more and 11 mm or less, preferably 2 mm or more and 10 mm or less, and more preferably 3 mm or more and 9 mm or less.

An inner diameter D3 of the intermediate diameter portion 45 is larger than the inner diameter D2 of the small diameter portion 46 and smaller than the inner diameter D1 of the pipe member 2. Therefore, in the pipe connection member 4, a rigidity of the intermediate diameter portion 45 adjacent to the storage space 21 is lower than a rigidity of the small diameter portion 46. Thus, in the pipe connection member 4, when the central portion 24 of the pipe member 2 expands due to the pressure of the fuel, the intermediate diameter portion 45 of the pipe connection member 4 also tends to expand following the central portion 24 of the pipe member 2.

The inner diameter D3 of the intermediate diameter portion 45 is not particularly limited as long as it satisfies the above conditions. For example, from the viewpoint of ensuring sufficient rigidity of the intermediate diameter portion 45, the inner diameter D3 of the intermediate diameter portion 45 is larger than an orifice diameter, and may have a size that does not substantially function as an orifice in relation to the small diameter portion 46 (a size that does not substantially have an orifice effect), for example, greater than 1 mm, preferably greater than 2 mm, and more preferably greater than 3 mm. In addition, from the viewpoint of easily expanding following the central portion 24 of the pipe member 2, the inner diameter D3 of the intermediate diameter portion 45 may be less than 14 mm, preferably less than 13 mm, and more preferably less than 12 mm. Maximum and minimum values thereof can be combined as appropriate, and the inner diameter D1 of the pipe member 2 may, for example, be greater than 1 mm and less than 14 mm, preferably greater than 2 mm and less than 13 mm, and more preferably greater than 3 mm and less than 12 mm.

In the extending direction B, a length L1 of the intermediate diameter portion 45 may be shorter than an insertion length L2 of the pipe connection member 4 into the pipe member 2. The insertion length L2 of the pipe connection member 4 into the pipe member 2 is a length of the insertion surface 42 in the extending direction B. Also, the length L1 of the intermediate diameter portion 45 in the extending direction B may be longer than a thickness T1 of the intermediate diameter portion 45.

The thickness T1 of the intermediate diameter portion 45 is not particularly limited. For example, from the viewpoint of ensuring sufficient rigidity of the intermediate diameter portion 45, the thickness T1 of the intermediate diameter portion 45 may be 0.3 times or more, preferably 0.7 times or more, and more preferably 0.9 times or more a thickness T2 of the pipe member 2. In addition, from the viewpoint of easily expanding following the central portion 24 of the pipe member 2, the thickness T1 of the intermediate diameter portion 45 may be 1.5 times or less, preferably 1.3 times or less, and more preferably 1.1 times or less the thickness T2 of the pipe member 2. Maximum and minimum values thereof can be combined as appropriate, and for example, the thickness T1 of the intermediate diameter portion 45 may be 0.3 times or more and 1.5 times or less, preferably 0.7 times or more and 1.3 times or less, and more preferably 0.9 times or more and 1.1 times or less the thickness T2 of the pipe member 2.

The tapered diameter portion 47 is connected to the intermediate diameter portion 45 and the small diameter portion 46. An inner diameter of the tapered diameter portion 47 decreases from the intermediate diameter portion 45 side (the inner tip end **4*b* side) to the small diameter portion 46 side (the outer tip end 4*a*** side).

In a reference cross section (the cross section shown in FIGS. 2 and 3) including the central axis A, an inner peripheral surface of the tapered diameter portion 47 may extend linearly from the intermediate diameter portion 45 to the small diameter portion 46, may extend in a curved shape from the intermediate diameter portion 45 to the small diameter portion 46 or may bend and extend from the intermediate diameter portion 45 to the small diameter portion 46.

An angle θ1 formed by the inner peripheral surface of the tapered diameter portion 47 in the reference cross section including the central axis A is not particularly limited. For example, from the viewpoint of curbing the pipe connection member 4 becoming too long, the angle θ1 may be 110° or more, preferably 113° or more, and more preferably 115° or more. In addition, from the viewpoint that the intermediate diameter portion 45 of the sensor connection member 5 easily expand following the central portion 24 of the pipe member 2, the angle θ1 may be 160° or less, preferably 155° or less, and more preferably 150° or less. Maximum and minimum values thereof can be combined as appropriate, and for example, the angle θ1 may be 110° or more and 160° or less, preferably 113° or more and 155° or less, and more preferably 115° or more and 150° or less. When the inner peripheral surface of the tapered diameter portion 47 does not extend linearly from the intermediate diameter portion 45 to the small diameter portion 46, the angle θ1 formed by the inner peripheral surface of the tapered diameter portion 47 in the reference cross section including the central axis A is an angle formed by an imaginary line that connects a tip end of the inner peripheral surface of the tapered diameter portion 47 on the intermediate diameter portion 45 side and a tip end thereof on the small diameter portion 46 side.

Figure 4:
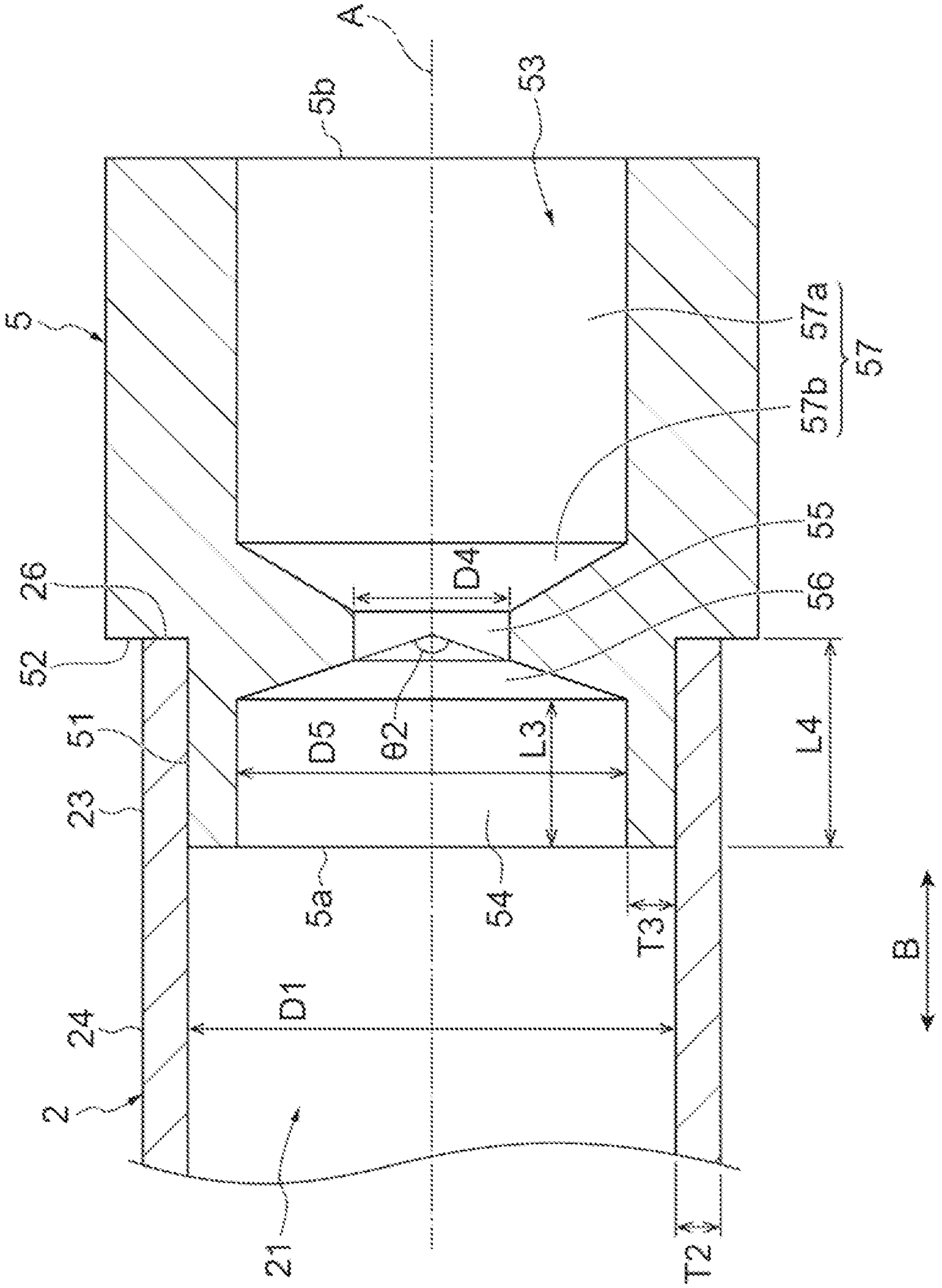
FIG. 4 is a schematic cross-sectional view enlarging the periphery of the sensor connection member in FIG. 2.

FIG. 4 is a schematic cross-sectional view enlarging the periphery of the sensor connection member in FIG. 2. As shown in FIGS. 1, 2 and 4, the sensor connection member 5 is a connection member connected to a fuel pressure sensor (not shown) that detects the pressure of fuel stored in the storage space 21. The sensor connection member 5 is formed in a tubular shape around the central axis A of the pipe member 2. A tip end of the sensor connection member 5 on one side in the extending direction B (a tip end on the left side in FIGS. 1, 2 and 4) is referred to as an inner tip end **5*a*, and a tip end of the sensor connection member 5 on the other side in the extending direction B (a tip end on the right side in FIGS. 1, 2 and 4) is referred to as an outer tip end 5*b***.

The sensor connection member 5 is inserted into and joined to the tip end portion 23 of the pipe member 2. The joining of the sensor connection member 5 to the tip end portion 23 of the pipe member 2 can be performed by brazing, welding, or the like. In the present embodiment, the sensor connection member 5 is joined to the pipe member 2 by brazing.

An outer peripheral surface of the sensor connection member 5 has an insertion surface 51 and a contact surface 52.

The insertion surface 51 extends in the extending direction B from the inner tip end 5*a* toward the outer tip end 5*b* in a cylindrical shape. The contact surface 52 rises radially outward of the sensor connection member 5 from the insertion surface 51 on the outer tip end 5*b* side of the insertion surface 51. Then, in a state in which the insertion surface 51 is inserted into the tip end portion 23 of the pipe member 2 and the contact surface 52 is in contact with a tip end surface 26 of the tip end portion 23 of the pipe member 2, the insertion surface 51 is brazed to the tip end portion 23 of the pipe member 2. The contact surface 52 of the sensor connection member 5 may also be brazed to the tip end surface 26 of the pipe member 2. The tip end surface 26 of the pipe member 2 is an end surface of the pipe member 2 on the tip end portion 23 side in the extending direction B. Further, a tapered surface or the like may be formed between the insertion surface 51 and the inner tip end 5*a* to easily insert the sensor connection member 5 into the tip end portion 23 of the pipe member 2.

An outer diameter of the insertion surface 51 before being inserted into the tip end portion 23 of the pipe member 2 may be larger than the inner diameter of the pipe member 2. Thus, the insertion surface 51 is brazed by inserting the insertion surface 51 into the tip end portion 23 of the pipe member 2 and brazing while being press-fitted into the tip end portion 23 of the pipe member 2. For example, unevenness may be formed on the insertion surface 51 by knurling or the like so that the maximum outer diameter of the protrusion is larger than the inner diameter of the pipe member 2 and the minimum outer diameter of the recess is smaller than the inner diameter of the pipe member 2. Thus, since the protrusion portion is pressed against the tip end portion 23 of the pipe member 2 and the brazing material enters the recessed portion, the rigidity of the joining of the insertion surface 51 to the tip end portion 23 of the pipe member 2 can be increased.

An inner peripheral surface of the sensor connection member 5 forms a through hole 53 for supplying high-pressure fuel supplied from the fuel pipe to the storage space 21. The through hole 53 is adjacent to the storage space 21 and extends in the extending direction B around the central axis A of the pipe member 2.

The sensor connection member 5 has an intermediate diameter portion 54, a small diameter portion 55, a tapered diameter portion 56 and a sensor connection portion 57. The intermediate diameter portion 54 is a part of the sensor connection member 5 adjacent to the storage space 21. The small diameter portion 55 is a part of the sensor connection member 5 located on the side opposite to the storage space 21 with respect to the intermediate diameter portion 54. The tapered diameter portion 56 is a part of the sensor connection member 5 located between the intermediate diameter portion 54 and the small diameter portion 55 and connected to the intermediate diameter portion 54 and the small diameter portion 55. The sensor connection portion 57 is a part of the sensor connection member 5 located on the side opposite to the small diameter portion 55 with respect to the storage space 21. The intermediate diameter portion 54, the tapered diameter portion 56 and at least a part of the small diameter portion 55 form the insertion surface 51. That is, the insertion surface 51 is formed by an outer peripheral surface of the intermediate diameter portion 54, an outer peripheral surface of the tapered diameter portion 56, and at least a part of an outer peripheral surface of the small diameter portion 55.

An inner diameter D4 of the small diameter portion 55 is smaller than the inner diameter D1 of the pipe member 2. In the present embodiment, the inner diameter D4 of the small diameter portion 55 is the smallest inner diameter of the through hole 53.

The inner diameter D4 of the small diameter portion 55 is not particularly limited. For example, from the viewpoint of being able to appropriately transmit the pressure of the fuel stored in the storage space 21 to the fuel pressure sensor, the inner diameter D4 of the small diameter portion 55 may be 3 mm or more, preferably 3.5 mm or more, and more preferably 4 mm or more. Further, from the viewpoint of curbing the fuel distribution pipe 1 becoming too large, the inner diameter D4 of the small diameter portion 55 may be 9 mm or less, preferably 7 mm or less, and more preferably 5 mm or less. Maximum and minimum values thereof can be combined as appropriate, and for example, the inner diameter D4 of the small diameter portion 55 may be 3 mm or more and 9 mm or less, preferably 3.5 mm or more and 7 mm or less, and more preferably 4 mm or more and 5 mm or less.

An inner diameter D5 of the intermediate diameter portion 54 is larger than the inner diameter D4 of the small diameter portion 55 and smaller than the inner diameter D1 of the pipe member 2. Therefore, in the sensor connection member 5, the rigidity of the intermediate diameter portion 54 adjacent to the storage space 21 is lower than the rigidity of the small diameter portion 55. Thus, in the sensor connection member 5, when the central portion 24 of the pipe member 2 expands due to the pressure of the fuel, the intermediate diameter portion 54 of the sensor connection member 5 also tends to expand following the central portion 24 of the pipe member 2.

The inner diameter D5 of the intermediate diameter portion 54 is not particularly limited as long as it satisfies the above conditions. For example, from the viewpoint of ensuring sufficient rigidity of the intermediate diameter portion 54, the inner diameter D5 of the intermediate diameter portion 54 is larger than the orifice diameter, and may have a size that does not substantially function as an orifice in relation to the small diameter portion 55 (a size that does not substantially have an orifice effect), for example, larger than 3 mm, preferably greater than 3.5 mm, and more preferably greater than 4 mm. In addition, from the viewpoint of easily expand following the central portion 24 of the pipe member 2, the inner diameter D5 of the intermediate diameter portion 54 may be less than 14 mm, preferably less than 13 mm, and more preferably less than 12 mm. Maximum and minimum values thereof can be combined as appropriate, and for example, the inner diameter D5 of the intermediate diameter portion 54 may be greater than 3 mm and less than 14 mm, preferably greater than 3.5 mm and less than 13 mm, and more preferably greater than 4 mm and less than 12 mm.

In the extending direction B, a length L3 of the intermediate diameter portion 54 may be shorter than an insertion length L4 of the sensor connection member 5 into the pipe member 2. The insertion length L4 of the sensor connection member 5 into the pipe member 2 is a length of the insertion surface 51 in the extending direction B. Also, the length L3 of the intermediate diameter portion 54 in the extending direction B may be longer than a thickness T3 of the intermediate diameter portion 54.

The thickness T3 of the intermediate diameter portion 54 is not particularly limited. For example, a range of the thickness T3 of the intermediate diameter portion 54 may be the same as a range of the thickness T1 of the intermediate diameter portion 45 of the pipe connection member 4. The thickness T3 of the intermediate diameter portion 54 may be the same as or different from the thickness T1 of the intermediate diameter portion 45 of the pipe connection member 4.

The tapered diameter portion 56 is connected to the intermediate diameter portion 54 and the small diameter portion 55. The inner diameter of the tapered diameter portion 56 decreases from the intermediate diameter portion 54 side (the inner tip end 5*a* side) to the small diameter portion 55 side (the outer tip end 5*b* side).

In the reference cross section (the cross section shown in FIGS. 2 and 4) including the central axis A, an inner peripheral surface of the tapered diameter portion 56 may extend linearly from the intermediate diameter portion 54 to the small diameter portion 55, may extend in a curved shape from the intermediate diameter portion 54 to the small diameter portion 55, or may bend and extend from the intermediate diameter portion 54 to the small diameter portion 55.

An angle θ2 formed by the inner peripheral surface of the tapered diameter portion 56 in the reference cross section including the central axis A is not particularly limited. For example, a range of the angle θ2 formed by the inner peripheral surface of the tapered diameter portion 56 may be the same as the range of the angle θ1 formed by the inner peripheral surface of the tapered diameter portion 47 of the pipe connection member 4. The angle θ2 formed by the inner peripheral surface of the tapered diameter portion 56 may be the same as or different from the angle θ1 formed by the inner peripheral surface of the tapered diameter portion 47 of the pipe connection member 4. When the inner peripheral surface of the tapered diameter portion 56 does not extend linearly from the intermediate diameter portion 54 to the small diameter portion 55, the angle θ2 formed by the inner peripheral surface of the tapered diameter portion 56 in the reference cross section including the central axis A is an angle formed by an imaginary line that connects the tip end of the inner peripheral surface of the tapered diameter portion 56 on the intermediate diameter portion 54 side and the tip end thereof on the small diameter portion 55 side.

The fuel pressure sensor is connected to the sensor connection portion 57. The fuel pressure sensor is connected to the sensor connection portion 57 to detect the pressure of the fuel stored in the storage space 21 via the small diameter portion 55. An inner peripheral surface of the sensor connection portion 57 has a female screw surface 57*a* to which the fuel pressure sensor is screwed, and a sensor contact surface 57*b* with which the fuel pressure sensor screwed to the female screw surface 57*a* is in contact. The female screw surface 57*a* forms a female screw for screwing the fuel pressure sensor. The female screw surface 57*a* extends in the extending direction B from the outer tip end 5*b* toward the inner tip end 5*a*. A tapered surface or the like may be formed between the female screw surface 57*a* and the outer tip end 5*b* to facilitate screwing of the fuel pressure sensor. The sensor contact surface 57*b* is adjacent to the small diameter portion 55. The sensor contact surface 57*b* is formed in a tapered shape so that an inner diameter thereof decreases from the outer tip end 5*b* side to the inner tip end 5*a* side in accordance with a shape of the fuel pressure sensor.

Figure 5:
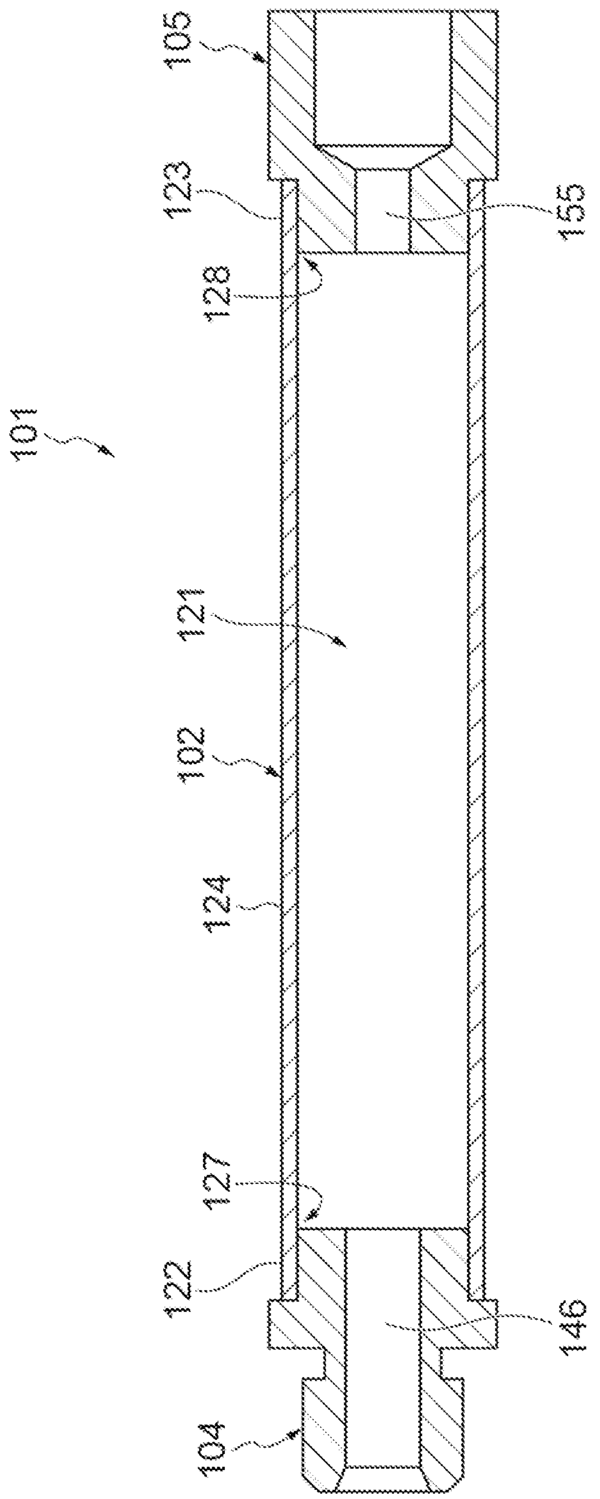
FIG. 5 is a schematic cross-sectional view showing a part of a fuel distribution pipe of Comparative example 1.

Here, a fuel distribution pipe 101 of Comparative example 1 will be described with reference to FIG. 5. The fuel distribution pipe 101 of Comparative example 1 shown in FIG. 5 includes a pipe member 102 similar to the pipe member 2, a pipe connection member 104 corresponding to the pipe connection member 4, and a sensor connection member 105 corresponding to the sensor connection member 5. The pipe connection member 104 has a small diameter portion 146 having the same inner diameter as the small diameter portion 46 instead of the intermediate diameter portion 45, the small diameter portion 46 and the tapered diameter portion 47 of the pipe connection member 4. The sensor connection member 105 has a small diameter portion 155 having the same inner diameter as the small diameter portion 55 instead of the intermediate diameter portion 54, the small diameter portion 55 and the tapered diameter portion 56 of the sensor connection member 5.

In the fuel distribution pipe 101 of Comparative example 1 configured in this way, when the pressure of the fuel supplied to the storage space 121 is received, the rigidity of a tip end portion 122 of the pipe member 102 into which the pipe connection member 104 is inserted and joined increases due to the small diameter portion 146 of the pipe connection member 104, and thus expansion is inhibited. Similarly, the rigidity of a tip end portion 123 of the pipe member 102 to which the sensor connection member 105 is joined increases due to the small diameter portion 155 of the sensor connection member 105, and thus expansion is inhibited. As a result, only a central portion 124 of the pipe member 102 tends to expand, and thus high stress is generated at a boundary portion 127 between the central portion 124 of the pipe member 102 and a tip end portion 122 thereof and a boundary portion 128 between the central portion of the pipe member 102 and a tip end portion 123 thereof. Thus, metal fatigue may be accelerated and life may be shortened.

On the other hand, in the fuel distribution pipe 1 according to the present embodiment, the pipe connection member 4 inserted into and joined to the tip end portion 22 of the pipe member 2 has the intermediate diameter portion 45 adjacent to the storage space 21 and the small diameter portion 46 disposed on the side opposite to the storage space 21 with respect to the intermediate diameter portion 45, and the intermediate diameter portion 45 has the inner diameter D3 that is smaller than the inner diameter D1 of the pipe member 2 and larger than the inner diameter D2 of the small diameter portion 46. That is, in the pipe connection member 4, the rigidity of the intermediate diameter portion 45 adjacent to the storage space 21 is lower than the rigidity of the small diameter portion 46. Therefore, when the fuel pressure is received, the intermediate diameter portion 45 of the pipe connection member 4 also easily expands following the central portion 24 forming the storage space 21 of the pipe member 2. Thus, the stress generated in the boundary portion 27 between the central portion 24 and the tip end portion 22 of the pipe member 2 is curbed. Similarly, the sensor connection member 5 inserted into and joined to the tip end portion 23 of the pipe member 2 has the intermediate diameter portion 54 adjacent to the storage space 21 and the small diameter portion 55 disposed on the side opposite to the storage space 21 with respect to the intermediate diameter portion 54, and the intermediate diameter portion 54 has the inner diameter D5 that is smaller than the inner diameter D1 of the pipe member 2 and larger than the inner diameter D4 of the small diameter portion 55. That is, in the sensor connection member 5, the rigidity of the intermediate diameter portion 54 adjacent to the storage space 21 is lower than the rigidity of the small diameter portion 55. Therefore, when the fuel pressure is received, the intermediate diameter portion 54 of the sensor connection member 5 also easily expand following the central portion 24 forming the storage space 21 of the pipe member 2. Thus, the stress generated in the boundary portion 28 between the central portion 24 and the tip end portion 23 of the pipe member 2 is curbed.

In addition, in the fuel distribution pipe 1, since a cross section perpendicular to the central axis A of the pipe member 2 of the storage space 21 is substantially the same in the entire region of the pipe member 2 in the extending direction B, when the pipe member 2 expands due to the pressure of the fuel, it is possible to curb occurrence of local stress concentration.

Further, in the fuel distribution pipe 1, since the tapered diameter portion 47 connected to the intermediate diameter portion 45 and the small diameter portion 46 and having an inner diameter that decreases from the intermediate diameter portion 45 side to the small diameter portion 46 side is formed at the pipe connection member 4, the intermediate diameter portion 45 can be made to expand more easily following the central portion 24 forming the storage space 21 of the pipe member 2. Thus, the stress generated in the boundary portion 27 between the central portion 24 and the tip end portion 22 of the pipe member 2 is further curbed. Similarly, since the tapered diameter portion 56 connected to the intermediate diameter portion 54 and the small diameter portion 55 and having an inner diameter that decreases from the intermediate diameter portion 54 side to the small diameter portion 55 side is formed at the sensor connection member 5, the intermediate diameter portion 54 can be made to expand more easily following the central portion 24 forming the storage space 21 of the pipe member 2. Thus, the stress generated in the boundary portion 28 between the central portion 24 and the tip end portion 23 of the pipe member 2 is further curbed.

Further, in the fuel distribution pipe 1, since the angles θ1 and θ2 formed by the inner peripheral surfaces of the tapered diameter portion 47 and the tapered diameter portion 56 in the reference cross section including the central axis A of the pipe member 2 are 110° or more and 160° or less, excessive lengthening of the pipe connection member 4 and the sensor connection member 5 can be curbed, and the intermediate diameter portion 45 of the pipe connection member 4 and the intermediate diameter portion 54 of the sensor connection member 5 can appropriately expand.

In addition, in the fuel distribution pipe 1, since the pipe connection member 4 and the sensor connection member 5 are joined while being inserted into the tip end portions 22 and 23 of the pipe member 2, the pipe connection member 4 and the sensor connection member 5 can be firmly joined to the pipe member 2.

Further, in the fuel distribution pipe 1, since the length L1 of the intermediate diameter portion 45 in the extending direction B of the pipe member 2 is shorter than the insertion length L2 of the pipe connection member 4 into the pipe member 2 and longer than the thickness T1 of the intermediate diameter portion 45, it is possible to curb the pipe connection member 4 becoming too long, and to expand the intermediate diameter portion 45 of the pipe connection member 4 appropriately. Similarly, since the length L3 of the intermediate diameter portion 54 in the extending direction B of the pipe member 2 is shorter than the insertion length L4 of the sensor connection member 5 into the pipe member 2 and longer than the thickness T3 of the intermediate diameter portion 54, it is possible to curb the sensor connection member 5 becoming too long, and to expand the intermediate diameter portion 54 of the sensor connection member 5 appropriately.

Further, in the fuel distribution pipe 1, since the thickness T1 of the intermediate diameter portion 45 is 0.3 times or more and 1.5 times or less, preferably 0.7 times or more and 1.3 times or less, and more preferably 0.9 times or more and 1.1 times or less the thickness T2 of the pipe member 2, the intermediate diameter portion 45 can more easily expand to follow the central portion 24 forming the storage space 21 of the pipe member 2 while the rigidity of the intermediate diameter portion 45 is sufficiently secured. Similarly, since the thickness T3 of the intermediate diameter portion 54 is 0.3 times or more and 1.5 times or less, preferably 0.7 times or more and 1.3 times or less, and more preferably 0.9 times or more and 1.1 times or less the thickness T2 of the pipe member 2, the intermediate diameter portion 54 can more easily expand to follow the central portion 24 forming the storage space 21 of the pipe member 2 while the rigidity of the intermediate diameter portion 54 is sufficiently secured.

Further, in the fuel distribution pipe 1, since the pipe connection member 4 has the intermediate diameter portion 45, the fuel supplied from the fuel pipe can be appropriately supplied to the storage space over a long period of time. Similarly, since the sensor connection member 5 has the intermediate diameter portion 54, the pressure of the fuel stored in the storage space 21 can be appropriately transmitted to the fuel pressure sensor over a long period of time.

Further, in the fuel distribution pipe, since the inner diameter D2 of the small diameter portion 46 is 1 mm or more and 11 mm or less, preferably 2 mm or more and 10 mm or less, and more preferably 3 mm or more and 9 mm or less, it is possible to curb the fuel distribution pipe 1 becoming too large while the fuel supplied from the fuel pipe is appropriately supplied to the storage space 21, and it is possible to curb the passage of the fuel being obstructed. Similarly, since the inner diameter D4 of the small diameter portion 55 is 3 mm or more and 9 mm or less, preferably 3.5 mm or more and 7 mm or less, and more preferably 4 mm or more and 5 mm or less, it is possible to curb the fuel distribution pipe 1 from becoming too large while the pressure of the fuel stored in the storage space 21 is appropriately transmitted to the fuel pressure sensor, and it is possible to curb the passage of fuel being obstructed.

Second Embodiment

Next, a second embodiment will be described. The second embodiment is basically the same as the first embodiment, the only difference from the first embodiment is that the sensor connection member is joined onto the peripheral surface of the pipe member, and a lid member is joined to the tip end portion of the pipe member instead of the sensor connection member. Therefore, in the following description, only matters different from the first embodiment will be described, and the same description as in the first embodiment will be omitted.

Figure 6:
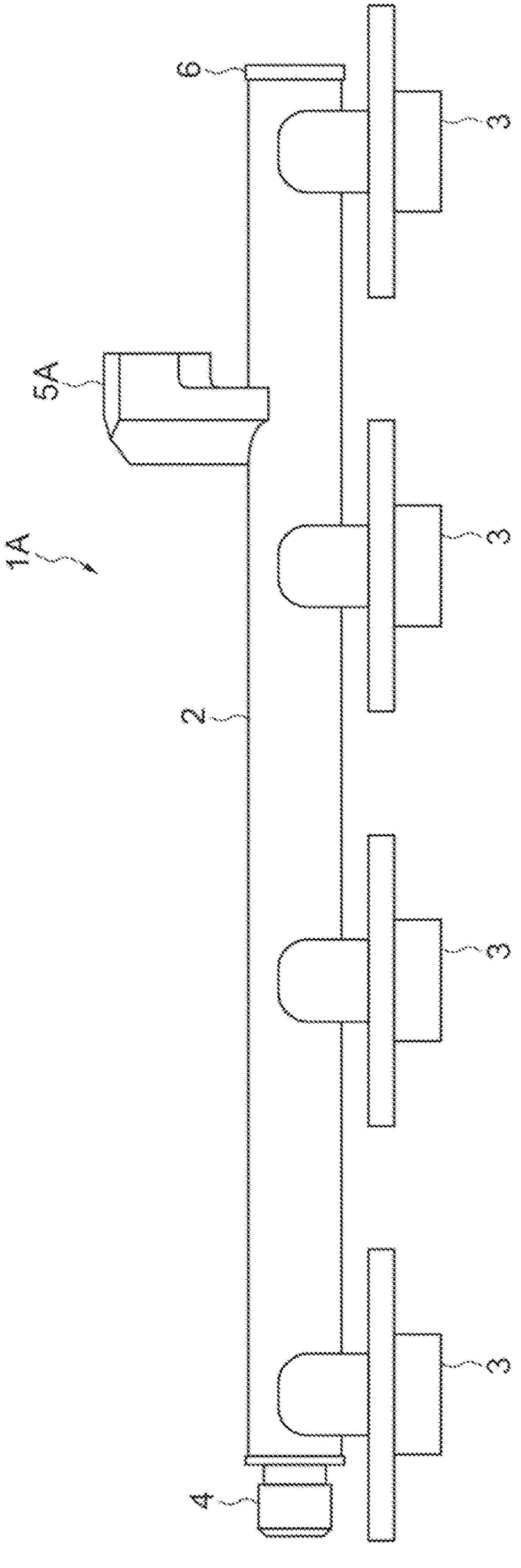
FIG. 6 is a schematic cross-sectional view of a fuel distribution pipe according to a second embodiment.
Figure 7:
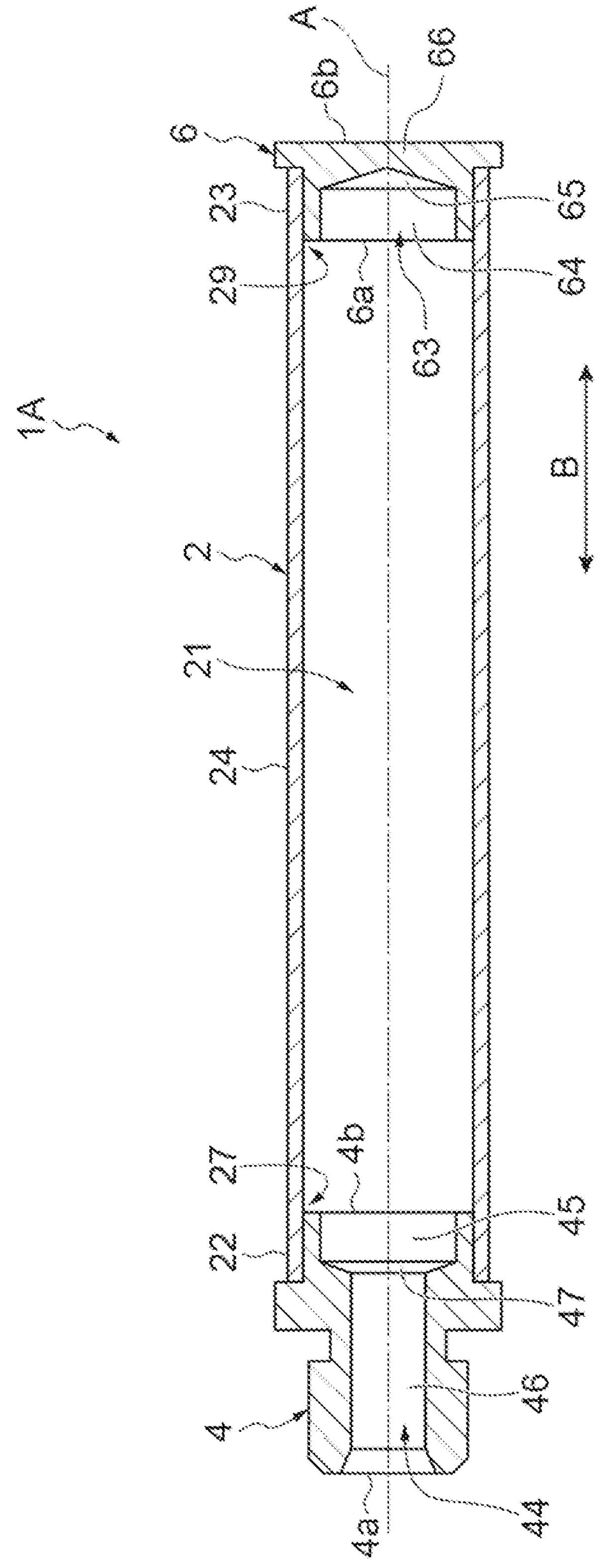
FIG. 7 is a schematic cross-sectional view showing a part of the fuel distribution pipe shown in FIG. 6.

FIG. 6 is a schematic perspective view of a fuel distribution pipe according to the second embodiment. FIG. 7 is a schematic cross-sectional view showing a part of the fuel distribution pipe shown in FIG. 6. As shown in FIGS. 6 and 7, the fuel distribution pipe 1A according to the present embodiment includes a pipe member 2, a plurality of housings 3, a pipe connection member 4, a sensor connection member 5A, and a lid member 6.

The sensor connection member 5A is a connection member connected to a fuel pressure sensor (not shown) that detects the pressure of fuel stored in the storage space 21, like the sensor connection member 5 of the first embodiment. The sensor connection member 5A is joined on the peripheral surface of the pipe member 2. The joining of the sensor connection member 5A to the peripheral surface of the pipe member 2 can be performed by brazing, welding, or the like.

The lid member 6 is inserted into and joined to the tip end portion 23 of the pipe member 2 on the other side (the right side in FIGS. 6 and 7) instead of the sensor connection member 5 of the first embodiment. Therefore, the storage space 21 is formed by the central portion 24 of the pipe member 2 into which the pipe connection member 4 and the lid member 6 are not inserted and joined.

Figure 8:
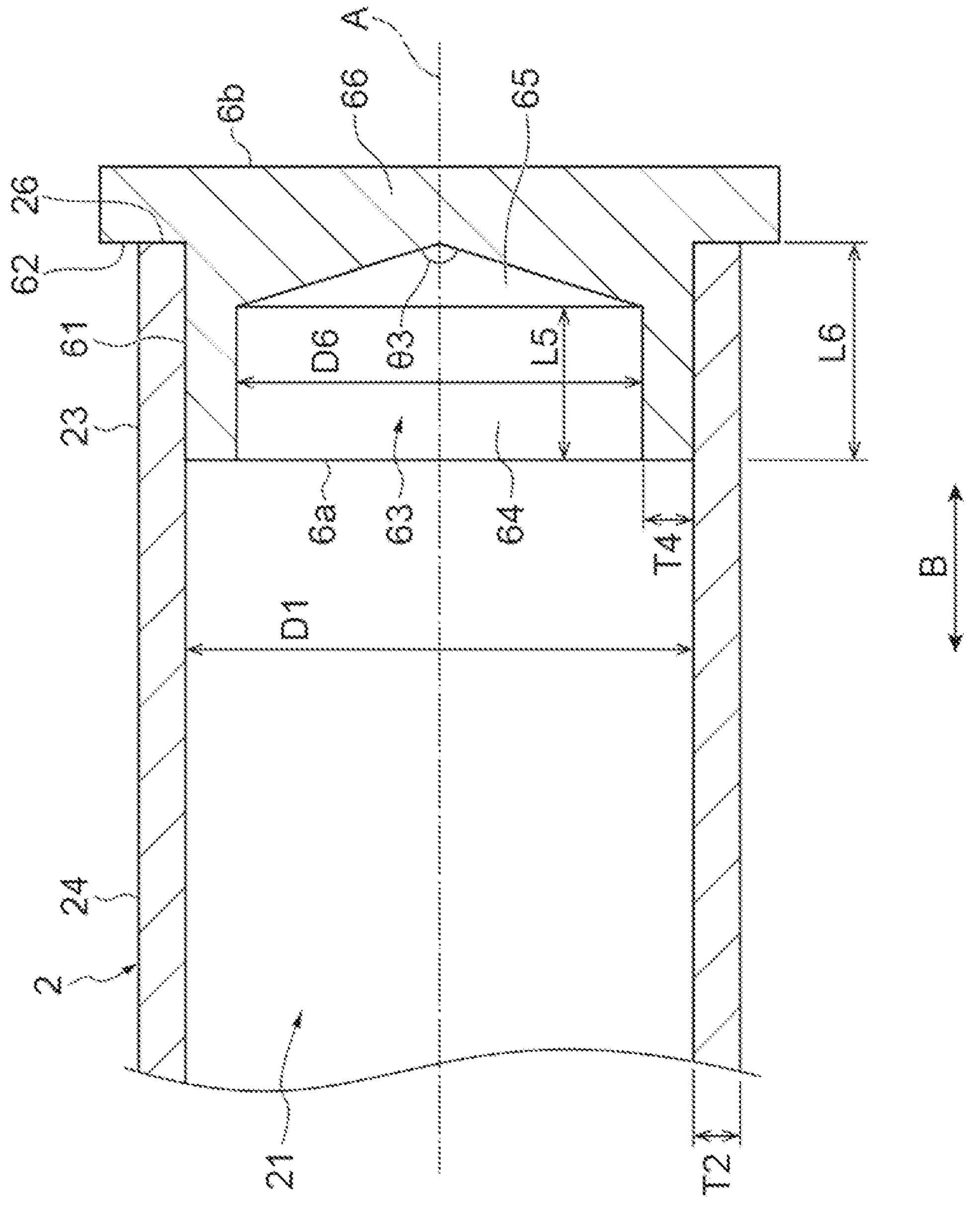
FIG. 8 is a schematic cross-sectional view enlarging the periphery of a lid member in FIG. 7.

FIG. 8 is a schematic cross-sectional view enlarging the periphery of the lid member in FIG. 7. As shown in FIGS. 6 to 8, the lid member 6 is a connection member that closes the other side of the pipe member 2. The lid member 6 is formed in a cap shape around the central axis A of the pipe member 2. A tip end of the lid member 6 on one side in the extending direction B (a left tip end in FIGS. 6 to 8) is referred to as an inner tip end 6*a*, and a tip end of the lid member 6 on the other side in the extending direction B (a right tip end in FIGS. 6 to 8) is referred to as an outer tip end 6*b*.

The lid member 6 is inserted into and joined to the tip end portion 23 of the pipe member 2. The joining of the lid member 6 to the tip end portion 23 of the pipe member 2 can be performed by brazing, welding, or the like. In the present embodiment, the lid member 6 is joined to the pipe member 2 by brazing.

An outer peripheral surface of the lid member 6 has an insertion surface 61 and a contact surface 62.

The insertion surface 61 extends in the extending direction B from the inner tip end 6*a* toward the outer tip end 6*b* in a cylindrical shape. The contact surface 62 rises radially outward of the lid member 6 from the insertion surface 61 on the outer tip end 6*b* side of the insertion surface 61. Then, in a state in which the insertion surface 61 is inserted into the tip end portion 23 of the pipe member 2 and the contact surface 62 is in contact with the tip end surface 26 of the tip end portion 23 of the pipe member 2, the insertion surface 61 is brazed to the tip end portion 23 of the pipe member 2. The contact surface 62 of the lid member 6 may also be brazed to the tip end surface 26 of the pipe member 2. Also, a tapered surface or the like may be formed between the insertion surface 61 and the inner tip end 4*b* to easily insert the lid member 6 into the tip end portion 23 of the pipe member 2.

An outer diameter of the insertion surface 61 before the insertion surface 61 is inserted into the tip end portion 23 of the pipe member 2 may be larger than the inner diameter of the pipe member 2. Thus, the insertion surface 61 is brazed by inserting the insertion surface 61 into the tip end portion 23 of the pipe member 2 and brazing in a state in which it is press-fitted into the tip end portion 23 of the pipe member 2. For example, unevenness may be formed on the insertion surface 61 by knurling or the like so that the maximum outer diameter of the protrusion is larger than the inner diameter of the pipe member 2 and the minimum outer diameter of the recess is smaller than the inner diameter of the pipe member 2. Thus, since the protrusion portion is pressed against the tip end portion 23 of the pipe member 2 and the brazing material enters the recessed portion, the rigidity of the joining of the insertion surface 61 to the tip end portion 23 of the pipe member 2 can be increased.

A recessed portion 63 adjacent to the storage space 21 and recessed from the inner tip end 6*a* toward the outer tip end 6*b* is formed in the lid member 6. The lid member 6 has a perforated portion 64, a tapered diameter portion 65 and a closed portion 66.

The perforated portion 64 is a part of the lid member 6 with a recessed portion 63 formed adjacent to the storage space 21. The tapered diameter portion 65 is a part of the lid member 6 in which the recessed portion 63 is formed adjacent to the perforated portion 64 on the side opposite to the storage space 21. The closed portion 66 is a part of the lid member 6 in which the recessed portion 63 is not formed adjacent to the tapered diameter portion 65 on the side opposite to the storage space 21. The perforated portion 64 and at least a part of the tapered diameter portion 65 form the insertion surface 61. That is, the insertion surface 61 is formed by an outer peripheral surface of the perforated portion 64 and at least a part of an outer peripheral surface of the tapered diameter portion 65. At least a part of the closed portion 66 may form the insertion surface 61. In this case, the insertion surface 61 is formed by the outer peripheral surface of the perforated portion 64, the outer peripheral surface of the tapered diameter portion 65, and the outer peripheral surface of at least a part of the closed portion 66.

In the lid member 6, rigidity of each of the perforated portion 64 adjacent to the storage space 21 and the tapered diameter portion 65 adjacent to the perforated portion 64 are lower than rigidity of the closed portion 66 due to the recessed portion 63. Therefore, when the pressure of the fuel is received, the central portion 24 of the pipe member 2 expands, and the perforated portion 64 of the lid member 6 also easily expand following the central portion 24 of the pipe member 2.

An inner diameter D6 of the perforated portion 64 is smaller than the inner diameter D1 of the pipe member 2. The inner diameter D6 of the perforated portion 64 is not particularly limited as long as it satisfies the above conditions. For example, from the viewpoint of ensuring sufficient rigidity of the perforated portion 64, the inner diameter D6 of the perforated portion 64 may be larger than 3 mm, preferably larger than 3.5 mm, and more preferably larger than 4 mm. Also, from the viewpoint of easily expand following the central portion 24 of the pipe member 2, the inner diameter D6 of the perforated portion 64 may be smaller than 14 mm, preferably smaller than 13 mm, and more preferably smaller than 12 mm. Maximum and minimum values thereof can be combined as appropriate, and for example, the inner diameter D6 of the perforated portion 64 may be greater than 3 mm and less than 14 mm, preferably greater than 3.5 mm and less than 13 mm, and more preferably greater than 4 mm and less than 12 mm.

In the extending direction B, a length L5 of the perforated portion 64 may be shorter than an insertion length L6 of the lid member 6 into the pipe member 2. The insertion length L6 of the lid member 6 into the pipe member 2 is a length of the insertion surface 61 in the extending direction B. Also, the length L5 of the perforated portion 64 in the extending direction B may be longer than a thickness T4 of the perforated portion 64.

The thickness T4 of the perforated portion 64 is not particularly limited. For example, a range of the thickness T4 of the perforated portion 64 may be the same as the range of the thickness T1 of the intermediate diameter portion 45 of the pipe connection member 4. The thickness T4 of the perforated portion 64 may be the same as or different from the thickness T1 of the intermediate diameter portion 45 of the pipe connection member 4.

The tapered diameter portion 65 is connected to the perforated portion 64 and the closed portion 66. An inner diameter of the tapered diameter portion 65 decreases from the perforated portion 64 side (the inner tip end 6*a* side) to the closed portion 66 side (the outer tip end 6*b* side).

In a reference cross section (a cross section shown in FIGS. 7 and 8) including the central axis A, an inner peripheral surface of the tapered diameter portion 65 may extend linearly from the perforated portion 64 to the closed portion 66, may extend in a curved shape from the perforated portion 64 to the closed portion 66, or may bend and extend from the perforated portion 64 to the closed portion 66.

An angle θ3 formed by the inner peripheral surface of the tapered diameter portion 65 in the reference cross section including the central axis A is not particularly limited. For example, a range of the angle θ3 formed by the inner peripheral surface of the tapered diameter portion 65 may be the same as the range of the angle θ1 formed by the inner peripheral surface of the tapered diameter portion 47 of the pipe connection member 4. The angle θ3 formed by the inner peripheral surface of the tapered diameter portion 65 may be the same as or different from the angle θ1 formed by the inner peripheral surface of the tapered diameter portion 47 of the pipe connection member 4. When the inner peripheral surface of the tapered diameter portion 65 does not extend linearly from the perforated portion 64 to the closed portion 66, the angle θ3 formed by the inner peripheral surface of the tapered diameter portion 65 in the reference cross section including the central axis A is an angle formed by an imaginary line that connects a tip end of the inner peripheral surface of the tapered diameter portion 32 on the perforated portion 64 side and a tip end thereof on the closed portion 66 side.

Figure 9:
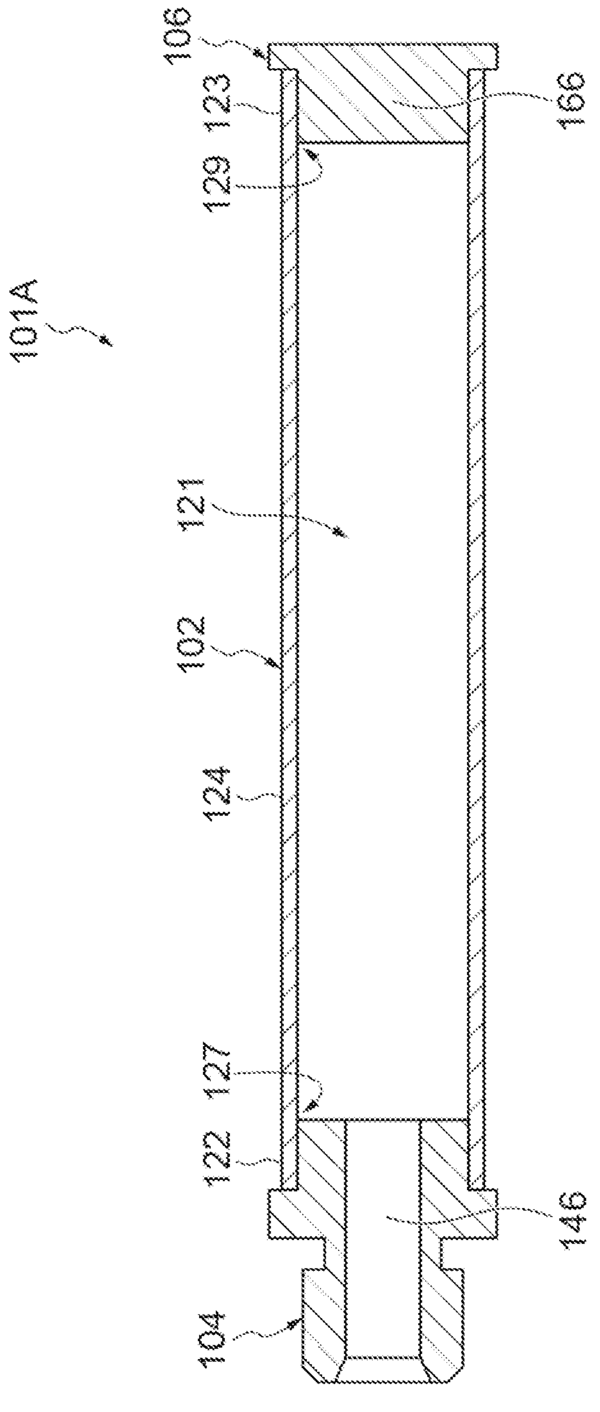
FIG. 9 is a schematic cross-sectional view showing a part of a fuel distribution pipe of Comparative example 2.

Here, a fuel distribution pipe 101A of Comparative example 2 will be described with reference to FIG. 9. The fuel distribution pipe 101A of Comparative example 2 shown in FIG. 9 includes a pipe member 102 similar to the pipe member 2, a pipe connection member 104 corresponding to the pipe connection member 4, and a lid member 106 corresponding to the lid member 6. In the fuel distribution pipe 101A of Comparative example 2, the pipe connection member 104 has a small diameter portion 146 having the same inner diameter as the small diameter portion 46 instead of the intermediate diameter portion 45, the small diameter portion 46 and the tapered diameter portion 47 of the pipe connection member 4. The lid member 106 has a closed portion 166 in which the recessed portion 63 of the lid member 6 is not formed instead of the perforated portion 64, the tapered diameter portion 65 and the closed portion 66 of the lid member 6.

In the fuel distribution pipe 101A of Comparative example 2 configured in this way, when the pressure of the fuel supplied to the storage space 121 is received, rigidity of a tip end portion 122 of the pipe member 102 into which the pipe connection member 104 is inserted and joined increases due to the small diameter portion 146 of the pipe connection member 104, and thus expansion is inhibited. Similarly, rigidity of a tip end portion 123 of the pipe member 102 to which the lid member 106 is connected increases due to the closed portion 166 of the lid member 106 and expansion is inhibited. As a result, only the central portion 124 of the pipe member 102 easily expand, and thus high stress is generated at a boundary portion 127 between the central portion 124 and the tip end portion 122 of the pipe member 102 and a boundary 129 between the central portion 124 of the pipe member 102 and the tip end portion 123. Thus, metal fatigue may be accelerated and life may be shortened.

On the other hand, in the fuel distribution pipe 1A according to the present embodiment, the pipe connection member 4 inserted into and joined to the tip end portion 22 of the pipe member 2 has the intermediate diameter portion 45 adjacent to the storage space 21 and the small diameter portion 46 disposed on the side opposite to the storage space 21 with respect to the intermediate diameter portion 45, and the intermediate diameter portion 45 has the inner diameter D3 that is smaller than the inner diameter D1 of the pipe member 2 and larger than the inner diameter D2 of the small diameter portion 46. That is, in the pipe connection member 4, the rigidity of the intermediate diameter portion 45 adjacent to the storage space 21 is lower than the rigidity of the small diameter portion 46. Therefore, when the fuel pressure is received, the intermediate diameter portion 45 of the pipe connection member 4 also easily expand following the central portion 24 forming the storage space 21 of the pipe member 2. Thus, the stress generated in the boundary portion 27 between the central portion 24 and the tip end portion 22 of the pipe member 2 is curbed. Similarly, the lid member 6 inserted into and joined to the tip end portion 23 of the pipe member 2 has the perforated portion 64 adjacent to the storage space 21 and having the recessed portion 63 formed therein. That is, in the lid member 6, the rigidity of the perforated portion 64 adjacent to the storage space 21 is lower than the rigidity of the closed portion 66. Therefore, when the fuel pressure is received, the perforated portion 64 of the lid member 6 also easily expands following the central portion 24 forming the storage space 21 of the pipe member 2. Thus, the stress generated in the boundary portion 29 between the central portion 24 and the tip end portion 23 of the pipe member 2 is curbed.

Further, in the fuel distribution pipe 1A, since the tapered diameter portion 65 connected to the side opposite to the storage space 21 of the perforated portion 64 and having an inner diameter that decreases from the inner tip end 6*a* side to the outer tip end 6*b* side is formed at the lid member 6, the perforated portion 64 can be made to expand more easily following the center portion 24 forming the storage space 21 of the pipe member 2. Thus, the stress generated in the boundary portion 29 between the central portion 24 and the tip end portion 23 of the pipe member 2 is further curbed.

Although preferred embodiments of one aspect of the present invention have been described above, one aspect of the present invention is not limited to the above embodiments.

For example, in the above embodiment, although an example using the pipe connection member and the sensor connection member as connection members has been described, the connection members may be a pipe connection member and a sensor connection member. Further, in the second embodiment, although an example in which the sensor connection member is joined to the peripheral surface of the pipe member has been described, the pipe connection member is joined to the tip end portion of the pipe member on one side, and the lid member is joined to the tip end of the pipe member on the other side, the pipe connection member may be joined to the peripheral surface of the pipe member, the sensor connection member may be joined to the tip end portion of the pipe member on one side, and the lid member may be joined to the tip end portion of the pipe member on the other side. As a reference example, the connection members such as the pipe connection member and the sensor connection member may be joined to the peripheral surface of the pipe member, and the lid member may be joined to the tip end portion of the pipe member on one side and the tip end portion thereof on the other side.

INDUSTRIAL APPLICABILITY

One aspect of the present invention can be used as a fuel distribution pipe that distributes and supplies fuel to a plurality of fuel injection devices.

REFERENCE SIGNS LIST

1 Fuel distribution pipe
1A Fuel distribution pipe

2 Pipe member
21 Storage space
22 Tip end portion
23 Tip end portion
24 Central portion
25 Tip end surface
26 Tip end surface
27 Boundary portion
28 Boundary portion
29 Boundary portion
3 Housing
4 Pipe connection member
4*a* Outer tip end
4*b* Inner tip end
41 Male screw surface
42 Insertion surface
43 Contact surface
44 Through hole
45 Intermediate diameter portion
46 Small diameter portion
47 Tapered diameter portion
5 Sensor connection member
5A Sensor connection member
5*a* Inner tip end
5*b* Outer tip end
51 Insertion surface
52 Contact surface
53 Through hole
54 Intermediate diameter portion
55 Small diameter portion
56 Tapered diameter portion
57 Sensor connection portion
57*a* Female screw surface
57*b* Sensor contact surface
6 Lid member
6*a* Inner tip end
6*b* Outer tip end
61 Insertion surface
62 Contact surface
63 Recessed portion
64 Perforated portion
65 Tapered diameter portion
66 Closed portion
101 Fuel distribution pipe
101A Fuel distribution pipe
102 Pipe member
104 Pipe connection member
105 Sensor connection member
106 Lid member
121 Storage space
122 Tip end portion
123 Tip end portion
124 Central portion
127 Boundary portion
128 Boundary portion
129 Boundary portion
146 Small diameter portion
155 Small diameter portion
166 Closed portion
A Central axis
B Extending direction
D1 to D6 Inner diameter
T1 to T4 Thickness
θ1 to θ3 Angle

The invention claimed is:

1. A fuel distribution pipe that distributes and supplies fuel supplied from a fuel pipe to a plurality of fuel injection devices, comprising:

a pipe member configured to form a storage space for storing the fuel therein; and two connection members respectively inserted into and joined to both tip end portions of the pipe member and having a through hole connected to the storage space, wherein one of the connection members is a pipe connection member connected to the fuel pipe, and an other connection member is a sensor connection member connected to a fuel pressure sensor that detects a pressure of fuel stored in the storage space, wherein the connection members have an intermediate diameter portion adjacent to the storage space and a small diameter portion disposed on a side opposite to the storage space with respect to the intermediate diameter portion, and wherein the intermediate diameter portion has an inner diameter that is larger than an inner diameter of the small diameter portion and smaller than an inner diameter of the pipe member.

2. The fuel distribution pipe according to claim 1, wherein a cross section of the storage space perpendicular to a central axis of the pipe member is substantially the same in an entire region of the pipe member in an extending direction.

3. The fuel distribution pipe according to claim 1, wherein the connection members further have a tapered diameter portion connected to the intermediate diameter portion and the small diameter portion and having an inner diameter that decreases from an intermediate diameter portion side to a small diameter portion side.

4. The fuel distribution pipe according to claim 3, wherein an angle formed by an inner peripheral surface of the tapered diameter portion in a reference cross section including a central axis of the pipe member is 110° or more and 160° or less.

5. The fuel distribution pipe according to claim 1, wherein, in an extending direction of the pipe member, a length of the intermediate diameter portion is shorter than an insertion length of the connection members into the pipe member and longer than a thickness of the intermediate diameter portion.

6. The fuel distribution pipe according to claim 1, wherein a thickness of the intermediate diameter portion is 0.3 times or more and 1.5 times or less a thickness of the pipe member.

7. The fuel distribution pipe according to claim 1, wherein the inner diameter of the small diameter portion of the pipe connection member is 1 mm or more and 11 mm or less.

8. The fuel distribution pipe according to claim 1, wherein the inner diameter of the small diameter portion of the sensor connection member is 3 mm or more and 9 mm or less.

* * * * *